April 28, 1970     D. E. SMITH     3,508,448
DUAL SPEED TRANSMISSION
Filed July 30, 1968     2 Sheets-Sheet 1
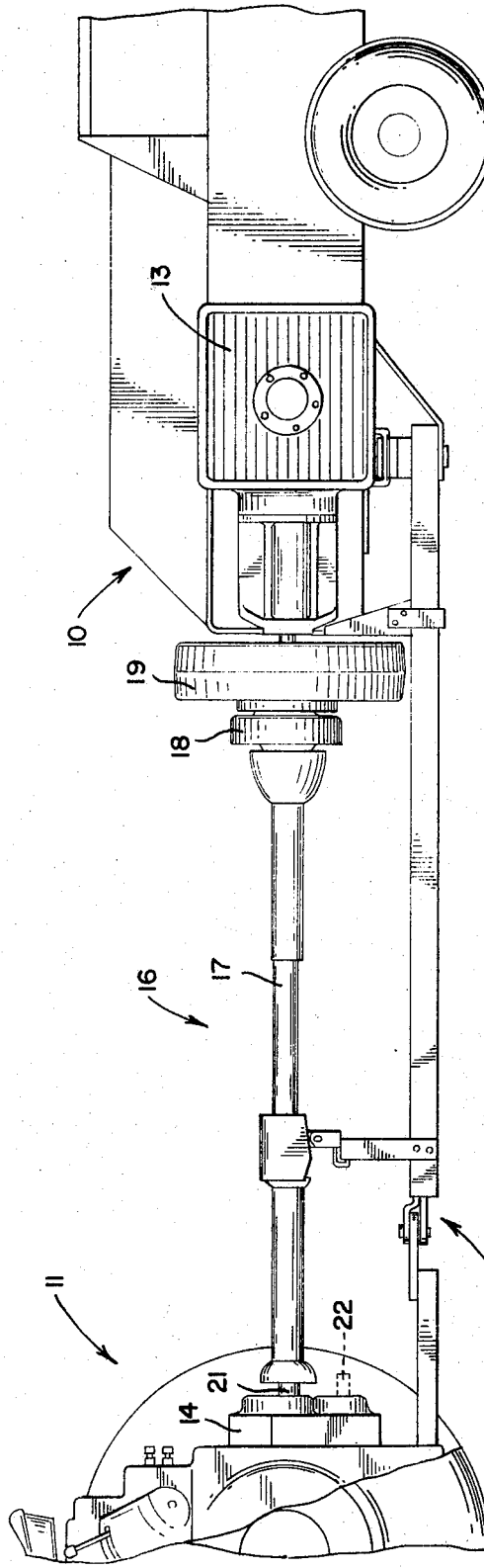
INVENTOR
D. EUGENE SMITH
BY *Robert L Graham*
ATT'Y.

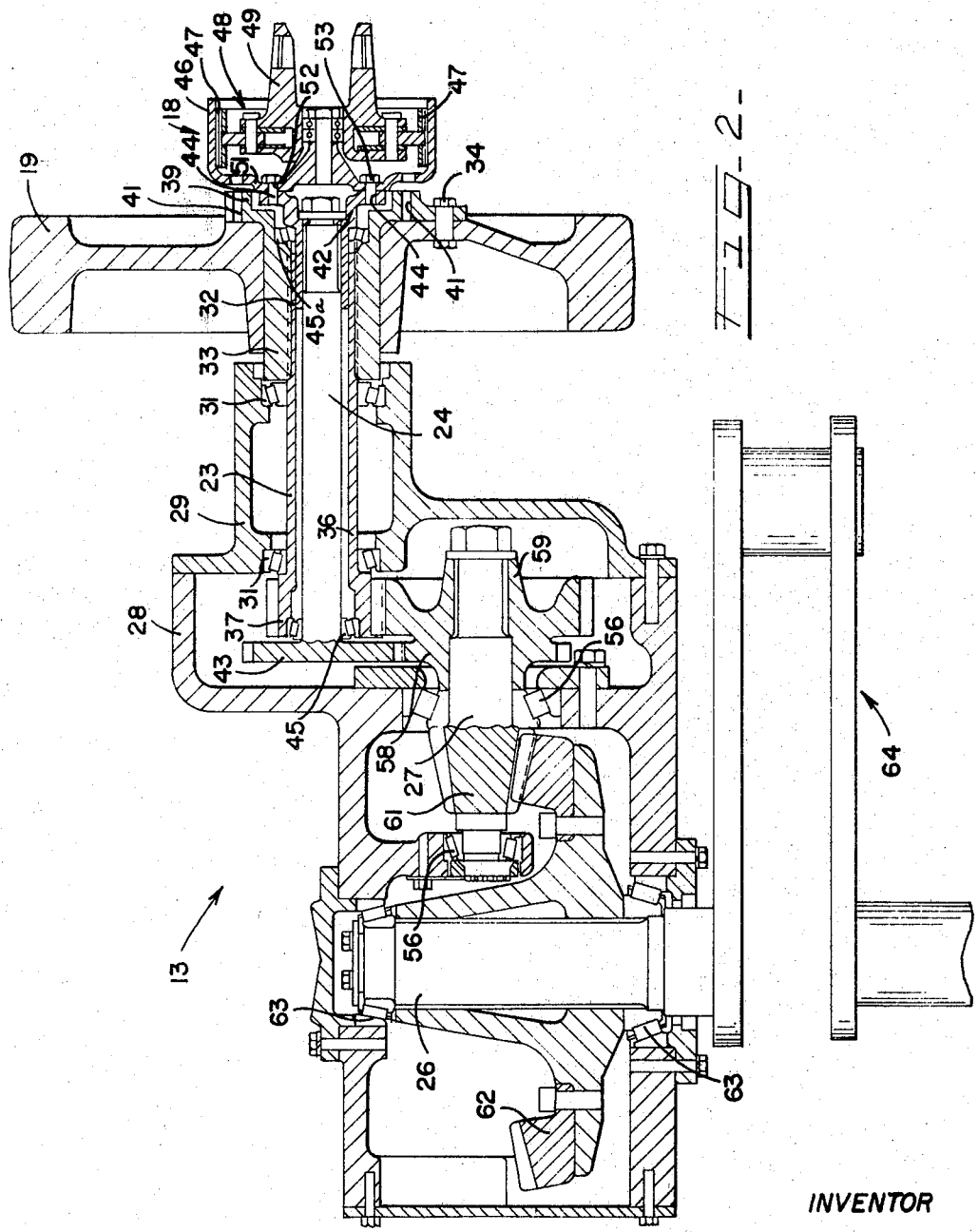

United States Patent Office 3,508,448
Patented Apr. 28, 1970

3,508,448
DUAL SPEED TRANSMISSION
D. Eugene Smith, Rolla, Mo., assignor to International Harvester Company, Chicago, Ill., a corporation of Delaware
Filed July 30, 1968, Ser. No. 748,675
Int. Cl. F16h *37/04, 3/08*
U.S. Cl. 74—15.4                              10 Claims

ABSTRACT OF THE DISCLOSURE

A baler transmission for use with either a low speed power take-off drive or a high speed power take-off drive of an associated tractor. The transmission includes a pair of power trains which are selectively and drivingly connected to said power output drives. A flywheel mounted on the high speed power train rotates at the high speed for either drive.

Background and summary of the invention

This invention relates generally to balers and more particularly to transmissions for balers of the type power driven by power take-off drives of associated tractors.

The driven parts of the conventional field baler are designed to operate at a constant speed. It is the function of the transmission to receive rotary power from an input power take-off drive shaft and deliver it to a power output shaft at a reduced speed. Tractors available for towing balers may be equipped with the standard 540 r.p.m. power take-off shaft or the 1000 r.p.m. power take-off shaft; which means that if the baler is to accommodate either type of drive, there must be provisions for selectively reducing the input speeds of 540 or 1000 r.p.m. to the implement speed, which in the case of a baler ranges from 60 to 75 r.p.m.

The general purpose of the present invention is to add versatility to the field baler by incorporating therein a transmission capable of receiving either of the aforementioned power take-off speeds and delivering a constant implement speed. Such a machine offers obvious advantages in equipment cost since the need for adaptors or auxiliary gear-reducing boxes is eliminated.

Briefly, the transmission constructed according to this invention has concentrically mounted power receiving shafts which are selectively connectable to either type of power take-off drive and each is adapted to deliver power to the output shaft through separate gear trains. By selecting the proper gear ratios, each train operates to deliver power at the implement speed.

The concentrically mounted shafts, because of the gear arrangement, are interacting which provides for an added feature of this invention. The high speed shaft, e.g., 1000 r.p.m., carries a flywheel so that when the lower speed shaft, e.g., 540 r.p.m., is in operation and owing to the interaction of the shafts, the flywheel is driven at 1000 r.p.m. Since the energy storing capacity of a flywheel is a function of its weight and the rim velocity, it follows that at the higher velocity, the weight, and hence the size of the flywheel, can be reduced to obtain the same flywheel effect.

Very briefly then, the objects of this invention are to: (1) provide a baler with a versatile transmission capable of accommodating either standard power take-off drives, and (2) provide a high speed flywheel operative with either the low speed or high speed drives.

Other objects and a better understanding of this invention may be had by reference to the following disclosure taken in conjunction with the attached drawings.

Drawings

FIGURE 1 is a side elevation of a tractor-baler combination interconnected by a power take-off drive; and FIGURE 2 is a sectional view of the baler transmission shown in FIGURE 1 and shown disconnected from the baler.

Description of the preferred embodiment

Referring to FIGURE 1, a baler 10 is shown towed behind a tractor 11 by a conventional drawbar and hitch linkage designated generally as 12. A transmission 13 mounted on the baler 10 is powered by a tractor power take-off drive 14 through a drive assembly 16 which comprises a three-joint drive shaft 17, an overrunning clutch 18, and a flywheel 19. In this embodiment the power take-off drive shaft 17 is connected to a standard 1000 r.p.m. power take-off shaft 21 but it should be understood that other tractors are provided with only the standard 540 r.p.m. power take-off shaft 22 (shown in phantom in FIGURE 1) and that by virtue of this invention, the baler 10 may be powered by either drive.

Now turning to FIGURE 2 the transmission 13 shown detached from the baler 10 includes a pair of concentrically mounted power receiving shafts 23 and 24, a power output shaft 26 and an intermediate shaft 27. The aforementioned shafts are housed in a transmission case 28 which includes a separable shaft carrier 29. The outer shaft 23 is tubular and is journaled to the carrier 29 by means of spaced, tapered roller bearings 31, 31. The shaft 23 has a splined end 32 connected to a flywheel hub 33 which is bolted to the flywheel 19 by a shear bolt 34. The opposite end 36 of shaft 23, disposed internally of the case 28, carries a pinion 37 thereon. The hub 33 has a forwardly-facing flanged portion 39 having a circle of threaded bolt holes 41 formed therein. As described in detail below, the bolt circle and the bolt holes 41 provide the means for drivingly connecting the overrunning clutch 18 to the outer shaft 23.

The inner shaft 24, concentrically mounted in the outer shaft 23, has one end splined to a flanged connector 42. The connector 42 fits internally of the hub flange 39 and the forwardly facing flanges of each are substantially coplanar. A spur gear 43 is mounted on the opposite end of the shaft 24 and is axially spaced from the spur gear 37 of the outer shaft 23. The flange connector 42 has formed therein a plurality of threaded bolt holes 44 arranged in a circle. A pair of tapered ball roller bearings 45 and 45a, respectively, mounted internally of the spur gear 37 and the hub 33 journally supports the inner shaft 24.

The overrunning clutch 18 includes a drum 46 which has formed therein an inner surface engageable with a pair of clutch shoes 47, 47. An assembly designated generally as 48 provides the means for transmitting rotary movement from a yoke 49 which is adapted to be attached to the power take-off drive shaft 17 (see FIGURE 1). The drum 46 has formed therein an annular boss 51 arranged in mating relation with the flange connector 42. The drum 46 has formed therein a plurality of holes 52 circumferentially aligned to register with the holes 44 of the flange 42. The clutch 18 is thusly secured to the inner shaft 24 by a plurality of bolts 53 which pass through the holes 52 of the drum 46 and are threaded to the holes 44 of the flange 42. In this embodiment the transmission 13 receives power from the 540 r.p.m. power take-off shaft 22 through the inner shaft 24. However, by providing the mounting means of the clutch 18 to mate with the mounting means of the shaft 23, power can be received from the 1000 r.p.m. power take-off shaft 21. Thus it will be appreciated that the gears 43 and 37 located adjacent one another are rotated at speeds of 540 and 1000 r.p.m., respectively.

The intermediate, pinion shaft 27 is journaled to the transmission case 28 by tapered roller bearings 56, 56 and carries at one end thereof a pair of integral spur gears 58 and 59. The spur gears 58 and 59 are arranged in intermeshing relation with gears 43 and 37, respectively. A bevel pinion 61 formed in the pinion shaft 27 and disposed intermediate the supporting bearings 56, 56 meshes with a ring bevel gear 62 which is splined to the output shaft 26. The shaft 26, supported in the case 28 by tapered roller bearings 63, 63 delivers power to a baler crankshaft 64 and to the other parts of the baler (not shown). Thus it will be appreciated that two separate power trains are available for delivering power to the output shaft 26 of the transmission 13. One train comprising shaft 24, gear 43, gear 58, shaft 27, pinion 61, and bevel gear 62 is adapted to operate with the 540 r.p.m. power take-off shaft and the other train comprising shaft 23, gear 37, gear 59, shaft 27, pinion 61, and gear 62 is adapted to operate with the 1000 r.p.m. power take-off shaft 22 (see FIGURE 1).

It should also be observed that power delivered through the 540 r.p.m. train is also transmitted back through the shaft 23 to the flywheel 19 at the stepped-up speed of 1000 r.p.m. Thus it will be appreciated that when the 540 r.p.m. drive assembly is used, the flywheel 19 rotates at 1000 r.p.m. thereby increasing the energy storing capacity of the flywheel 19.

In summary then the transmission constructed according to this invention includes separate power trains for selective connection with either the 540 r.p.m. power take-off drive or the 1000 r.p.m. power take-off drive and in either case the flywheel 19 is driven at the higher speed.

What is claimed is:

1. A transmission for an implement adapted to be driven by either a high speed power take-off drive or a low speed power take-off drive, said transmission comprising:
   a case;
   first an dsecond power receiving shaft mounted for rotation in said case;
   means for selectively connecting said first and second power receiving shafts to said high speed and low speed power take-off drives, respectively;
   a power output shaft drivingly connected to said implement;
   means connecting said first shaft to said power output shaft for driving said output shaft at a predetermined speed; and
   means connecting said second shaft to said output shaft for driving said output shaft at said predetermined speed;
   whereby power is delivered to said implement at said predetermined speed by either said high speed or said low speed power take-off drives.

2. The invention as recited in claim 1 and further comprising a flywheel mounted on said first shaft, said flywheel being driven at said high speed by either said high speed or said low speed power take-off drives.

3. The invention as recited in claim 1 wherein said second shaft is concentrically mounted in said first shaft.

4. A transmission for an implement and adapted to be used with either a high speed or low speed power take-off drives, said transmission comprising:
   a power output shaft;
   a first power train for driving said shaft at a predetermined speed, said power train including means for connection to said high speed drive; and
   a second power train for driving said shaft at said predetermined speed, said second power train including means for connection to said low speed drive.

5. The invention as recited in claim 4 wherein said first power train includes a flywheel associated therewith for co-rotation therewith, and wherein said transmission further comprises means interconnecting said first and second power trains whereby said flywheel is driven at said high speed by either said high speed or said low speed power take-off drives.

6. A transmission for an implement adapted to be driven by either a high speed power take-off drive or a low speed power take-off drive, said transmission comprising:
   a case;
   power receiving means mounted on said case;
   means for selectively and drivingly connecting said power receiving means to said high speed or said low speed power take-off drive;
   a power output shaft journaled to said case and drivingly connected to said implement; and
   power transmitting means interconnecting said output shaft and said power receiving means, and including first speed reducing means for driving said output shaft at a predetermined speed when said power receiving means is drivingly connected to said low speed power take-off drive, and second speed reducing means interconnecting said power receiving means and said output shaft for driving said output shaft at said predetermined speed when said power receiving means is drivingly connected to said high speed power take-off drive.

7. The invention as recited in claim 6 wherein said power receiving means includes first and second shafts journaled for rotation in said case, said means for selectively and independently connecting said power receiving means to either of said power take-off drives includes first means for connecting said first shaft to said high speed power take-off drive, and second means for connecting said second shaft to said low speed power take-off drive, and said power transmitting means includes a first power train including said first speed reducing means interconnecting said output shaft and said first shaft for driving said output shaft at said predetermined speed when said first shaft is driven by said high speed power take-off drive, and a second power train including said second speed reducing means interconnecting said second shaft and said power output shaft for driving said power output shaft at said predetermined speed when said second shaft is driven by said low speed power take-off drive.

8. The invention as recited in claim 7 wherein said second shaft is mounted for rotation internally of said first shaft, and said means for selectively and drivingly connecting said power receiving means to said power take-off drives includes a clutch selectively attachable to said first and said second shafts.

9. A transmission for an implement adapted to be driven by either a high speed power take-off drive or a low speed power take-off drive, said transmission comprising:
   a case;
   a first power receiving shaft journaled for rotation in said case;
   a second power receiving shaft concentrically mounted in said first shaft and journalled for rotation therein;
   means for selectively and drivingly connecting said first and second power receiving shafts to said high speed and said low speed power take-off drives;
   a power output shaft adapted to deliver power to said implement;
   an intermediate shaft journaled to said case and drivingly connected to said power output shaft;
   first power transmitting means interconnecting said first shaft to said intermediate shaft and particularly sized to drive said intermediate shaft at a predetermined speed when said first shaft is driven by said high speed power take-off drive; and
   second power transmitting means interconnecting said second shaft and said intermediate shaft and particularly sized to drive said intermediate shaft at said predetermined speed when said second shaft is driven by said low speed power take-off drive whereby power is delivered to said power output shaft at said predetermined speed by either said low speed or said high speed power take-off drives.

10. The invention as recited in claim 9 wherein said first and second shafts have adjacent ends disposed for connection to said connecting means and have opposite ends disposed internally of said case and axially spaced apart therein, said first power transmitting means includes a pair of intermeshing gears, one of said gears being mounted on said first shaft and the other of said gears being mounted on said intermediate shaft, and said second power transmitting means includes a pair of intermeshing gears, one of said gears being mounted on said second shaft and the other of said gears being mounted on said intermediate shaft, and said gear pairs of said first and second power transmitting means being arranged in side by side relation.

References Cited

UNITED STATES PATENTS

| 2,618,979 | 11/1952 | Benning | 74—15.4 |
| 2,975,643 | 3/1961 | Ferguson | 74—15.2 |
| 3,001,409 | 9/1961 | Von Fumetti | 74—11 |
| 3,002,393 | 10/1961 | Browning | 74—11 |
| 3,279,275 | 10/1966 | Christie | 74—15.4 X |

LEONARD H. GERIN, Primary Examiner

U.S. Cl. X.R.

74—325